(12) United States Patent
Chen et al.

(10) Patent No.: US 8,300,406 B2
(45) Date of Patent: Oct. 30, 2012

(54) SUPPORT FOOT APPARATUS AND METHODS

(75) Inventors: Hao-Ming Chen, Linkou Township, Taipei County (TW); Chih-Tsung Hu, Xizhi (TW); Chung Jen Jo, Sinjhuang (TW); Jen-Chun Hsu, Shulin (TW); Wen-Pin Huang, Sanchong (TW)

(73) Assignee: Dell Products, L.P., Round Rock, TX (US)

( * ) Notice: Subject to any disclaimer, the term of this patent is extended or adjusted under 35 U.S.C. 154(b) by 367 days.

(21) Appl. No.: 12/798,213

(22) Filed: Mar. 31, 2010

(65) Prior Publication Data
US 2011/0240819 A1  Oct. 6, 2011

(51) Int. Cl.
*G06F 1/16* (2006.01)
(52) U.S. Cl. ......... 361/679.55; 361/679.01; 361/679.57; 361/679.58; 248/188.8
(58) Field of Classification Search ............ 248/346.03, 248/188.1, 188.6, 188.8; 361/679.01, 679.55, 361/579.57, 679.58, 679.59, 679.57
See application file for complete search history.

(56) References Cited

U.S. PATENT DOCUMENTS

| | | | |
|---|---|---|---|
| 7,400,499 B2 | 7/2008 | Mundt et al. | |
| 7,450,373 B2 * | 11/2008 | Lee et al. | 361/679.55 |
| 7,988,342 B2 * | 8/2011 | Pahl | 362/391 |
| 8,154,860 B2 * | 4/2012 | Chen | 361/679.01 |
| 8,199,498 B2 * | 6/2012 | Wang et al. | 361/679.59 |

OTHER PUBLICATIONS

Wang et al., "Flexible Cell Battery Systems and Methods for Powering Information Handling Systems", filed Sep. 25, 2009; U.S. Appl. No. 12/586,676, 34 pgs.

* cited by examiner

*Primary Examiner* — Ramon Ramirez
*Assistant Examiner* — Todd M Epps
(74) *Attorney, Agent, or Firm* — O'Keefe, Egan, Peterman & Enders LLP

(57) ABSTRACT

Support foot apparatus that include a support foot structure that employs flexible flap members disposed on opposing sides of a central foot member, and that are configured for insertion into corresponding openings of a support foot location defined in an exterior surface of the chassis of an information handling system or other device or structure. Each of the flexible flap members may be provided with one or more securing apertures configured for placement over corresponding securing posts provided on an interior surface of the chassis to secure the flexible flap members of the support foot apparatus within the interior of the chassis at a support foot location to hold the central support body against an exterior surface of the chassis.

20 Claims, 9 Drawing Sheets

SUPPORT FOOT APPARATUS AND METHODS

FIELD OF THE INVENTION

This invention relates generally to support foot apparatus, and more particularly to support foot apparatus for information handling systems and other devices or structures.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of portable information handling systems include notebook computers. It is known to mount multiple resilient support feet to the underside of a notebook computer chassis. One example of a conventional support foot is a "stick-on" resilient member that is applied by adhesive to the underside of notebook computer chassis. Such support feet are prone to peeling off from the underside of the chassis. Another type of conventional support feet apparatus is a two-piece double-injection molded chassis foot apparatus that includes a resilient member and a plastic base member with extending posts that are deformed by heat staking to couple the chassis foot apparatus to the notebook computer chassis.

SUMMARY OF THE INVENTION

Disclosed herein are support foot apparatus that include a support foot structure that employs flexible flap members disposed on opposing sides of a central foot member. The opposing flexible flap members are configured for insertion into corresponding openings of a support foot location defined in an exterior surface of the chassis of an information handling system or other device or structure. Each of the flexible flap members may be provided with one or more securing apertures configured for placement over corresponding securing posts provided on an interior surface of the chassis to secure the flexible flap members of the support foot structure within the interior of the chassis at a support foot location in a manner that helps to hold the central support body against an exterior surface of the chassis and that resists peeling away of the support foot structure from the support foot location of the chassis.

In one exemplary embodiment, a support foot structure may be provided that may be advantageously assembled to a chassis in manual fashion by hand, and/or without using a fixture or heat staking process. In another exemplary embodiment, the central foot member and opposing flexible flap members may together be composed of a single piece of resilient material (e.g., rubber, urethane, thermoplastic urethane (TPU) or other rubber-like material) without the presence of any non-resilient material such as plastic or other rigid material. In such an exemplary embodiment, the disclosed support foot structure may be manufactured using a single step injection process without the complexity or cost of a multiple step injection molding process, while at the same time providing a support foot structure having good resistance to peel off from a chassis to which it has been secured.

In one respect, disclosed herein is a chassis assembly, including at least one support foot location and at least one support foot structure coupled to the chassis at the support foot location. The support foot location may include at least first and second flap openings defined within the chassis with a dividing member therebetween, and at least one first securing post and at least one second securing post disposed within the chassis such that the first flap opening is defined between the dividing member and the first securing post and the second flap opening is defined between the dividing member and the second securing post. The support foot may include a central foot member coupled between opposing first and second flexible flap members, each of the first and second flexible flap members having at least one securing aperture defined therein. The first flexible flap member may extend into the chassis through the first flap opening such that the securing aperture of the first flexible flap member is received around the first securing post and where the second flexible flap member extends into the chassis through the second flap opening such that the securing aperture of the second flexible flap member is received around the second securing post to substantially secure the central foot member in a position outside the chassis and adjacent the dividing member of the foot location.

In another respect, disclosed herein is a support foot structure configured to be coupled to a chassis at a support foot location having at least first and second flap openings defined within the chassis with a dividing member therebetween. The support foot structure may include a central foot member coupled between opposing first and second flexible flap members, each of the first and second flexible flap members having at least one securing aperture defined therein. The first and second flexible flap members may be configured such that the first flap member is extendable into the chassis through the first flap opening with the securing aperture of the first flexible flap member received around a first securing post of the support foot location at the same time that the second flexible flap member is extendable into the chassis through the second flap opening with the securing aperture of the second flexible flap member received around a second securing post of the support foot location to substantially secure the central foot member in a position outside the chassis and adjacent the dividing member of the foot location.

In another respect, disclosed herein is a method for coupling a support foot structure to a chassis, including: providing a support foot structure including a central foot member coupled between opposing first and second flexible flap members, each of the first and second flexible flap members having at least one securing aperture defined therein; providing a chassis having at least one support foot location that itself includes at least first and second flap openings defined within the chassis with a dividing member therebetween, and at least one first securing post and at least one second securing post disposed within the chassis such that the first flap opening is defined between the dividing member and the first securing post and the second flap opening is defined between the dividing member and the second securing post; inserting the first flexible flap member into the chassis through the first flap opening and placing the securing aperture of the first flexible flap member around the first securing post; and inserting the second flexible flap member into the chassis through the second flap opening and placing the securing aperture of the second flexible flap member around the second securing post to substantially secure the central foot member in a position outside the chassis and adjacent the dividing member of the foot location.

DESCRIPTION OF ILLUSTRATIVE EMBODIMENTS

Figure 1:
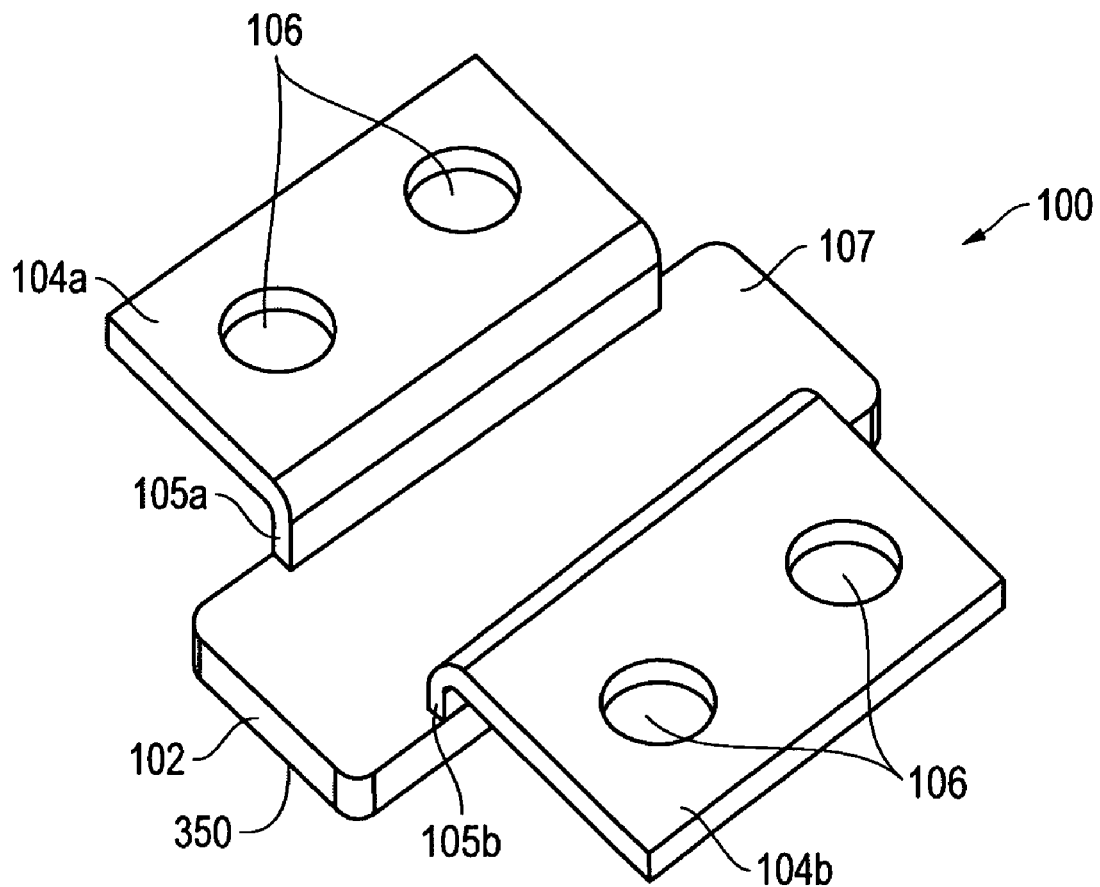
FIG. 1 illustrates a perspective view of a support foot apparatus configured according to one exemplary embodiment of the apparatus and methods disclosed herein.

FIG. 1 illustrates a perspective view of one exemplary embodiment of a resilient support foot apparatus 100 that includes a central foot member 102 with two opposing flexible flap members 104a and 104b that in this embodiment each include a respective flexible offset section 105a or 105b that couples the respective flexible flap member 104a or 104b to central foot member 102. As further shown, support foot apparatus 100 includes two securing apertures 106 defined in each of flexible flap members 104a and 104b. Each of securing apertures 106 is configured for placement over a corresponding securing post provided on an interior surface of an information handling system chassis or other type of device chassis as will be described further herein. A chassis side surface 107 is provided for contact with an exterior side of a device chassis is provided on one side of central foot member 102, and a support side surface 350 is provided on the opposing side of central foot member 102 as shown. Support foot apparatus 100 may be composed of a single piece of resilient material (e.g., rubber, urethane, thermoplastic urethane (TPU) or other rubber-like material) that is manufactured in a single-step injection molding process or other suitable manufacturing method. However, it will be understood that in other embodiments a support foot apparatus may alternatively manufactured from more than one piece and/or type of material, e.g., by a multiple step injection molding process or other suitable method. For example, at least a portion of the central foot member 102 may be composed of a non-resilient (e.g., hard plastic) material.

Figure 2:
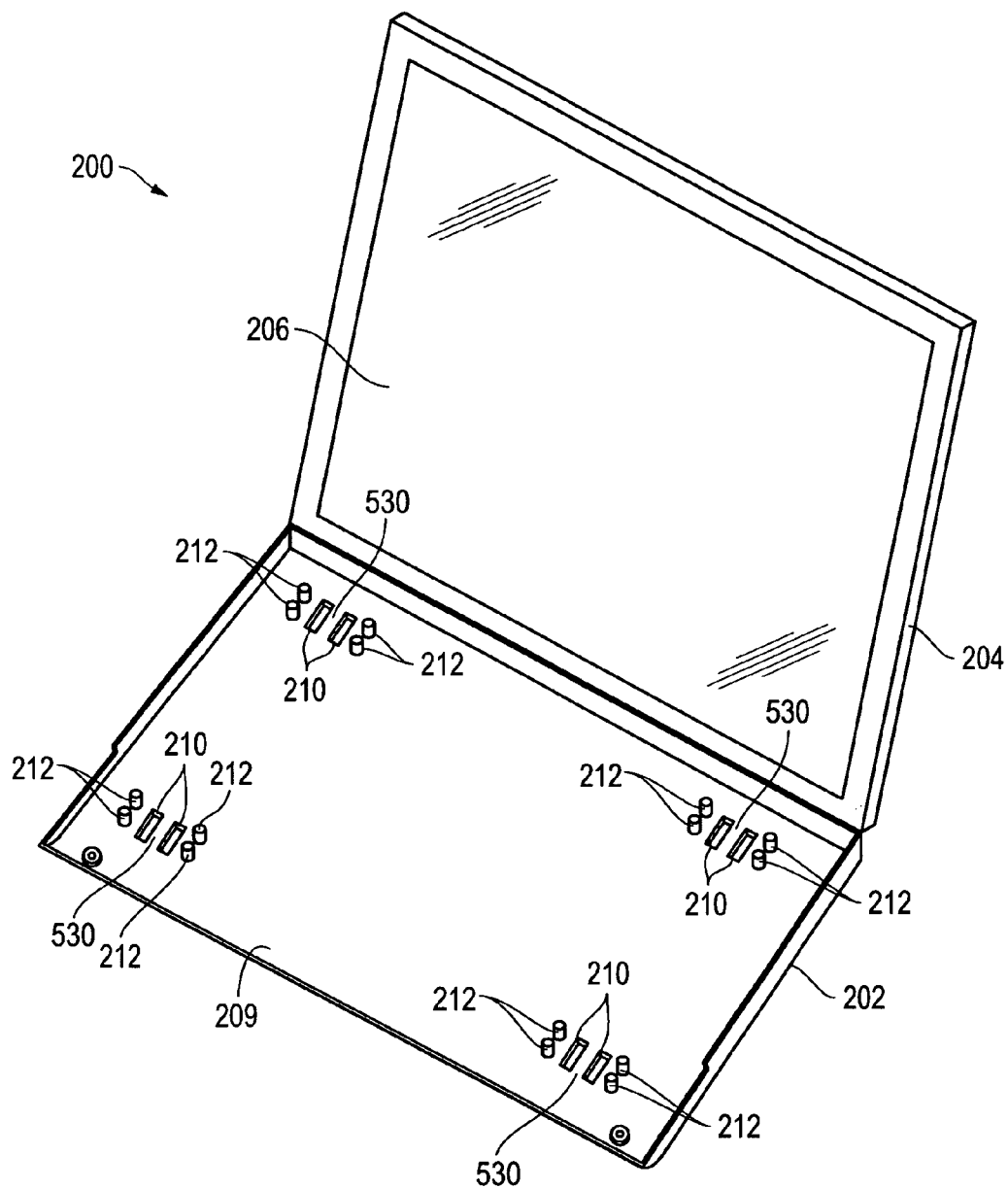
FIG. 2 illustrates a perspective view of a portable information handling system configured according to one exemplary embodiment of the apparatus and methods disclosed herein.

FIG. 2 is a perspective view of a portable information handling system configured in the form of a notebook computer 200 having a base chassis 202 and a lid 204 with a display 206 that is hingeably coupled thereto. Although a notebook computer is illustrated in FIG. 2, it will be understood that the disclosed support foot apparatus having a resilient support foot structure 100 may be used with other types of information handling systems (e.g., desktop computers, MP3 players, etc.), electronic devices (e.g., CD players, DVD players, external optical and magnetic hard drives, etc.), as well as any other type of device requiring one or more resilient support feet. Other examples of portable information handling systems include, but are not limited to, personal digital assistants (PDA), tablet PC's, etc.

In FIG. 2, chassis base 202 is shown without the presence of overlying system components (e.g., keyboard, touch pad, processor, motherboard, optical or hard drive, battery, etc.) such that the interior surface 209 of chassis base 202 is exposed from within. It will be understood that one or more of such system components may be present within an assembled information handling system chassis that includes one or more installed resilient support foot structures 100. Examples of such possible information handling system components may be found described in U.S. patent application Ser. No. 12/586,676, filed Sep. 25, 2009, which is incorporated herein by reference in its entirety.

Still referring to the exemplary embodiment of FIG. 2, chassis base 202 is provided with four support foot locations that each includes two securing apertures in the form of parallel slots 210 defined therein with a dividing member 530 therebetween. Each support foot location also includes two securing posts 212 disposed on either side of parallel slots 210 in the manner shown. Each securing post 212 extends inward as shown toward the interior of chassis base 202. In this exemplary embodiment, each parallel slot 210 is aligned with a complementary parallel slot 210 defined in chassis base 202. It will be understood that securing posts 212 may be formed as part of the interior surface 209 of chassis base 202 rather or as a separately molded part. Although four support foot locations are illustrated on a notebook computer chassis base in FIG. 2, it will be, understood that one or more support foot locations may be provided on any given surface and/or side of an information handling system chassis or other type of chassis, as may be needed or desired to fit the support needs for a given application.

Figure 3:
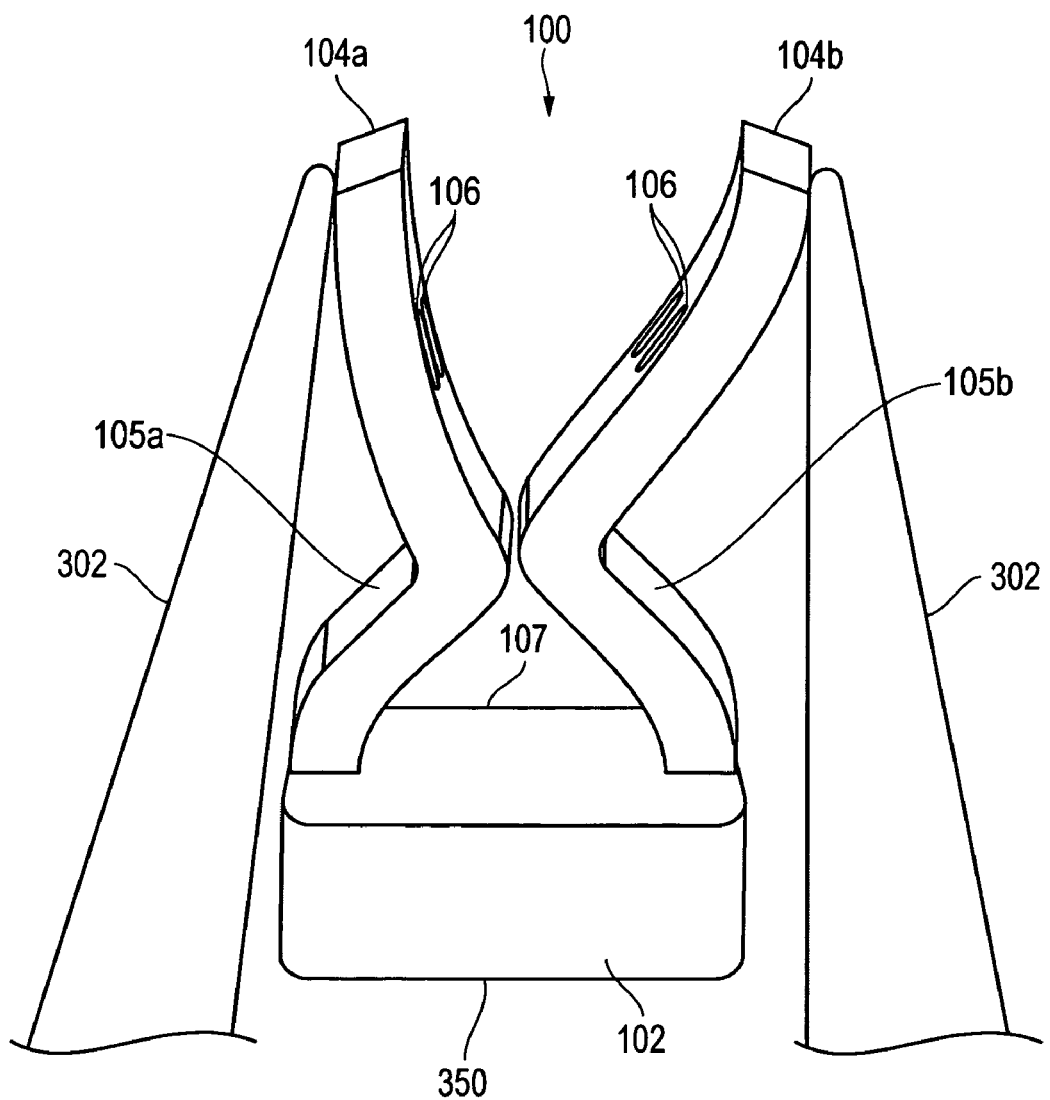
FIG. 3 illustrates a side view of a support foot apparatus configured according to one exemplary embodiment of the apparatus and methods disclosed herein.

FIG. 3 is a side view of resilient support foot structure 100 of FIG. 1 that illustrates flexible flap members 104a and 104b as they may be bent or flexed upward for insertion from into a corresponding pair of parallel slots 210 of a chassis base 202 such as illustrated in FIG. 2. In this case, FIG. 3 illustrates flexible flap members 104a and 104b bent upward by the jaws 302 of a pair of needle nose pliers. However, it will be understood that flexible flap members 104a and 104b may be bent using any other manual (e.g., by human hand) or automated method (e.g., using automated pick and place machine configured to deform flexible flap members 104a and 104b in the manner shown). As will be further described and illustrated herein, flexible flap members 104a and 104b of resilient support foot apparatus 100 are configured for insertion into parallel slots 210 from the exterior side of an information handling system chassis base 202 or other type of chassis.

Figure 4:
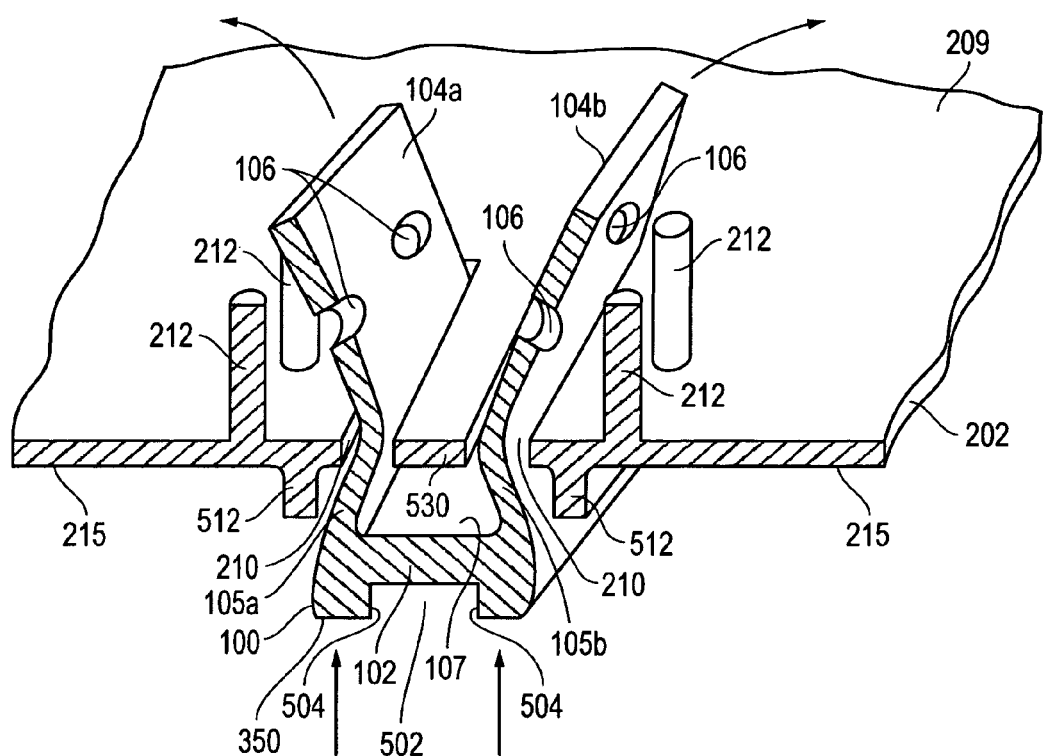
FIG. 4 illustrates a partial cross-sectional perspective view of a support foot apparatus and chassis support foot location configured according to one exemplary embodiment of the apparatus and methods disclosed herein.

FIG. 4 is a partial cross-sectional perspective view, showing insertion of flexible flap members 104a and 104b of a resilient support foot apparatus 100 into a pair of parallel slots 210 of a support foot location defined in the chassis base 202. As shown, flexible flap members 104a and 104b are inserted into slots 210 from the from the exterior side 215 of chassis base 202 in the direction shown by the arrows. Also shown in FIG. 4 are securing posts 212 that are placed to align with and be received within corresponding securing apertures 106 as chassis side surface 107 of support foot structure 100 is brought toward contact with dividing member 530. Also illustrated in FIG. 4 is an optional foot retaining feature 512 that projects outward from the exterior surface 215 of chassis base 202, and that may be dimensioned to receive and at least partially contain the outer boundary of central foot member 102 of resilient support foot structure 100, i.e., to help maintain chassis side surface 107 of central foot member 102 in place against the exterior side 215 of chassis base 202 without sideways sliding or movement. Further shown in FIG. 4 is an optional recess 502 at least partially surrounded by a flexible boundary wall 504 that may, be provided on support side surface 350 of central foot member 102, and which may be provided to help maintain support side surface 350 in place against a supporting surface, e.g., such as a desk top, table top or other work surface. In the exemplary embodiment of FIG. 4 securing posts 212 are molded as part of the interior surface 209 of chassis base 202, although they may alternatively be provided as a separately molded part.

Figure 5:
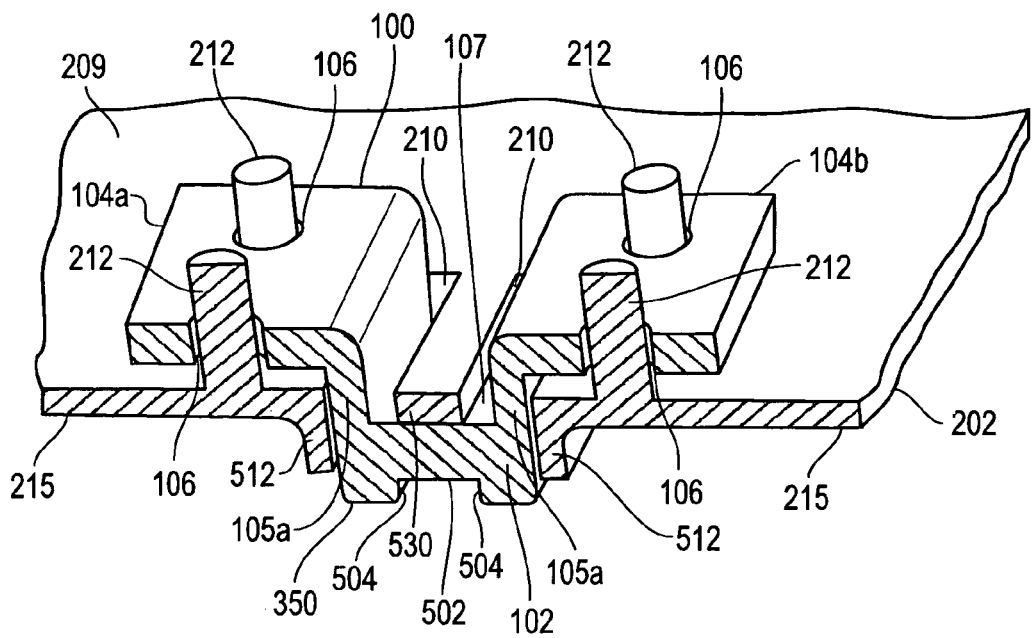
FIG. 5 illustrates a partial cross-sectional perspective view of a support foot apparatus and chassis support foot location configured according to one exemplary embodiment of the apparatus and methods disclosed herein.

FIG. 5 is a partial cross-sectional perspective view of the resilient support foot structure 100 of FIG. 4 in installed relationship at a support foot location of chassis base 202. As shown in FIG. 5, each securing post 212 is received within a corresponding securing aperture 106 in a manner that holds chassis side surface 107 of support foot structure 100 in contact against dividing member 530. As further shown, each of flexible offset sections 105a and 105b extend upwards through a corresponding parallel slot 210, and the length of each offset section 105 is configured so as to traverse a distance that is equivalent to the wall thickness of chassis base 202 in order to allow flexible flap members 104a and 104b to receive and be secureably retained by securing posts 212 with support foot structure 100 in contact against dividing member 530.

In one exemplary embodiment, chassis side surface 107 of support foot structure 100 may be optionally further secured against dividing member 530 using an adhesive (e.g., such as 3M Low Odor Acrylic Adhesive DP810 or double-sided adhesive such as 3M General Purpose Double-Sided Acrylic Adhesive Tissue Tape 9888T, each of which are available from 3M of St. Paul, Minn.) to help minimize any tendency for central foot member 102 to "float" in the Z-axis and/or move around or away relative to exterior surface 215 of chassis base 202. In another exemplary embodiment, each of securing posts 212 may be of plastic material and heat-staked (e.g., at greater than about 150° F.) after resilient support foot structure has been installed, i.e., to create a flared "mushroomed" or otherwise deformed head on the end of each of the securing posts 212 that has a shape that retains the corresponding securing aperture in place around the securing post 212 by preventing removal of the securing aperture from engagement with the securing post. In such an embodiment, one or more system components may then be placed or installed in place within chassis base 202 over the support foot locations.

Figure 6:
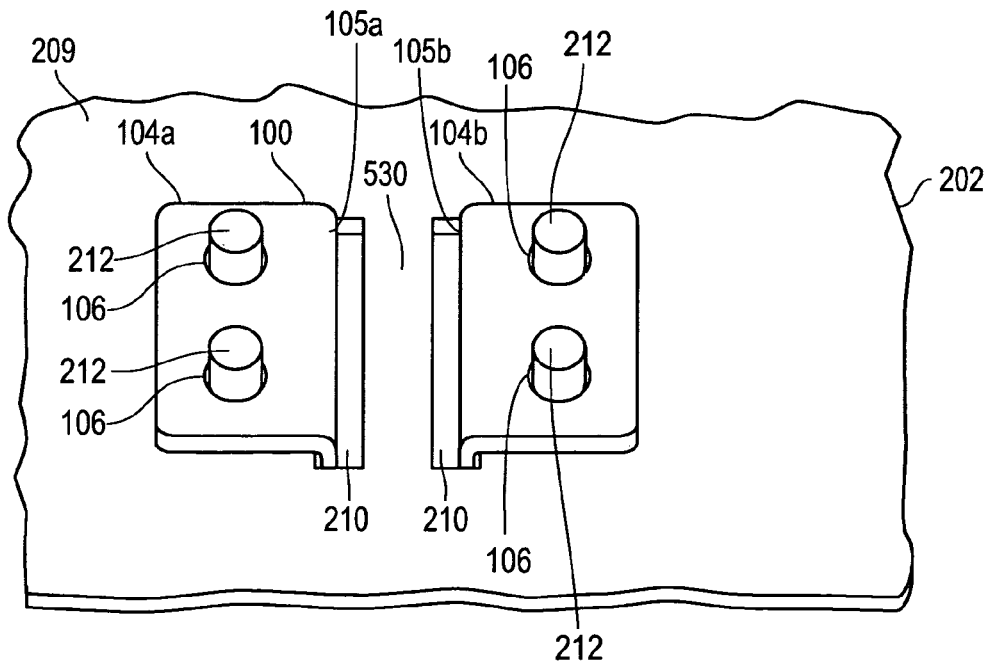
FIG. 6 illustrates an overhead partial perspective view of a support foot apparatus in installed relationship with a support location of a chassis base according to one exemplary embodiment of the apparatus and methods disclosed herein.
Figure 7:
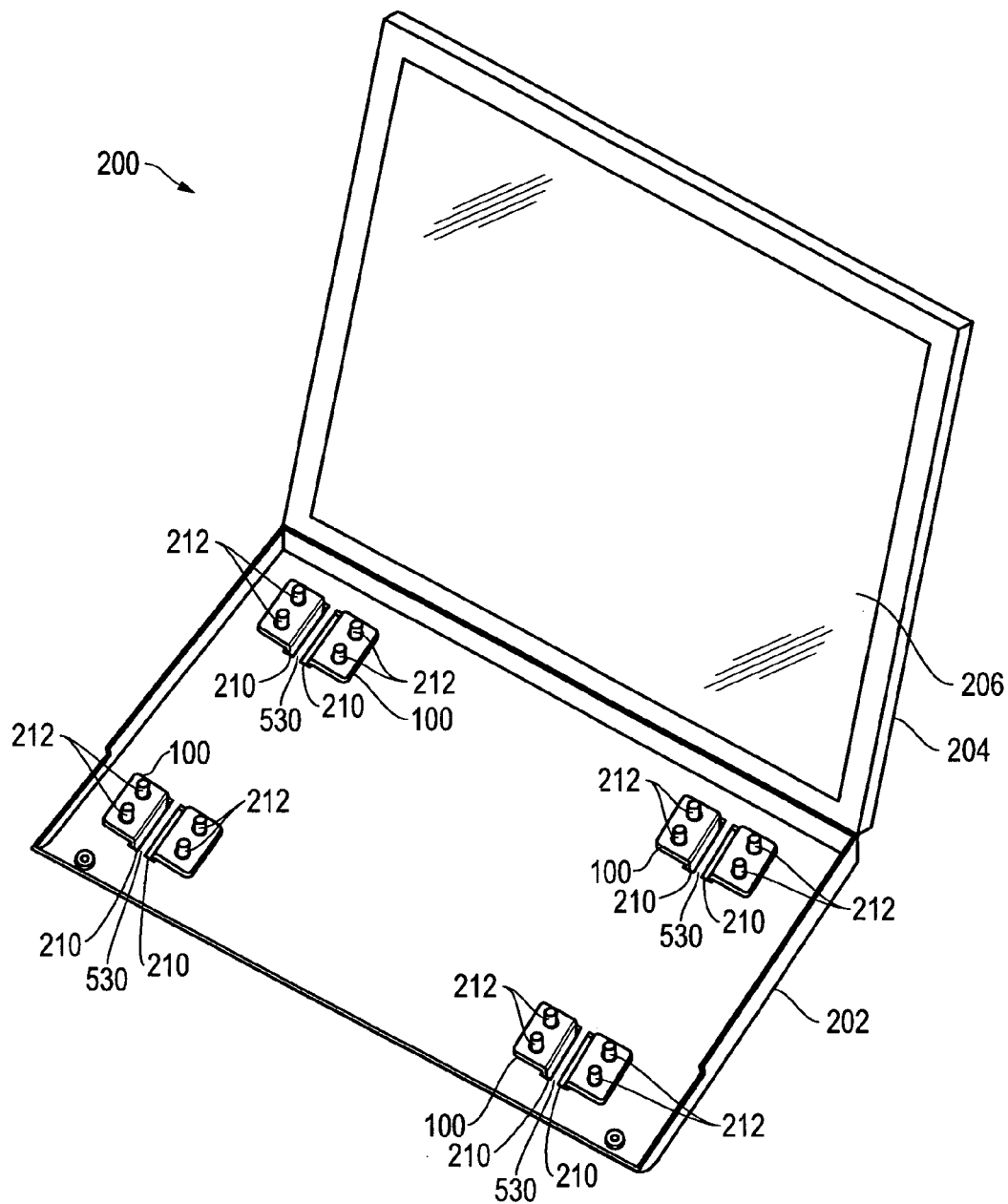
FIG. 7 illustrates a perspective view of a portable information handling system configured according to one exemplary embodiment of the apparatus and methods disclosed herein.

FIG. 6 illustrates an overhead partial perspective view of the assembly of FIG. 5, showing resilient support foot structure 100 in installed relationship with chassis base 202. FIG. 7 illustrates a perspective view of the interior surface 209 of chassis base 202 of notebook computer 200, and shows four assemblies of resilient support foot structure 100 in installed relationship with chassis base 202 according to one exemplary embodiment.

Figure 8:
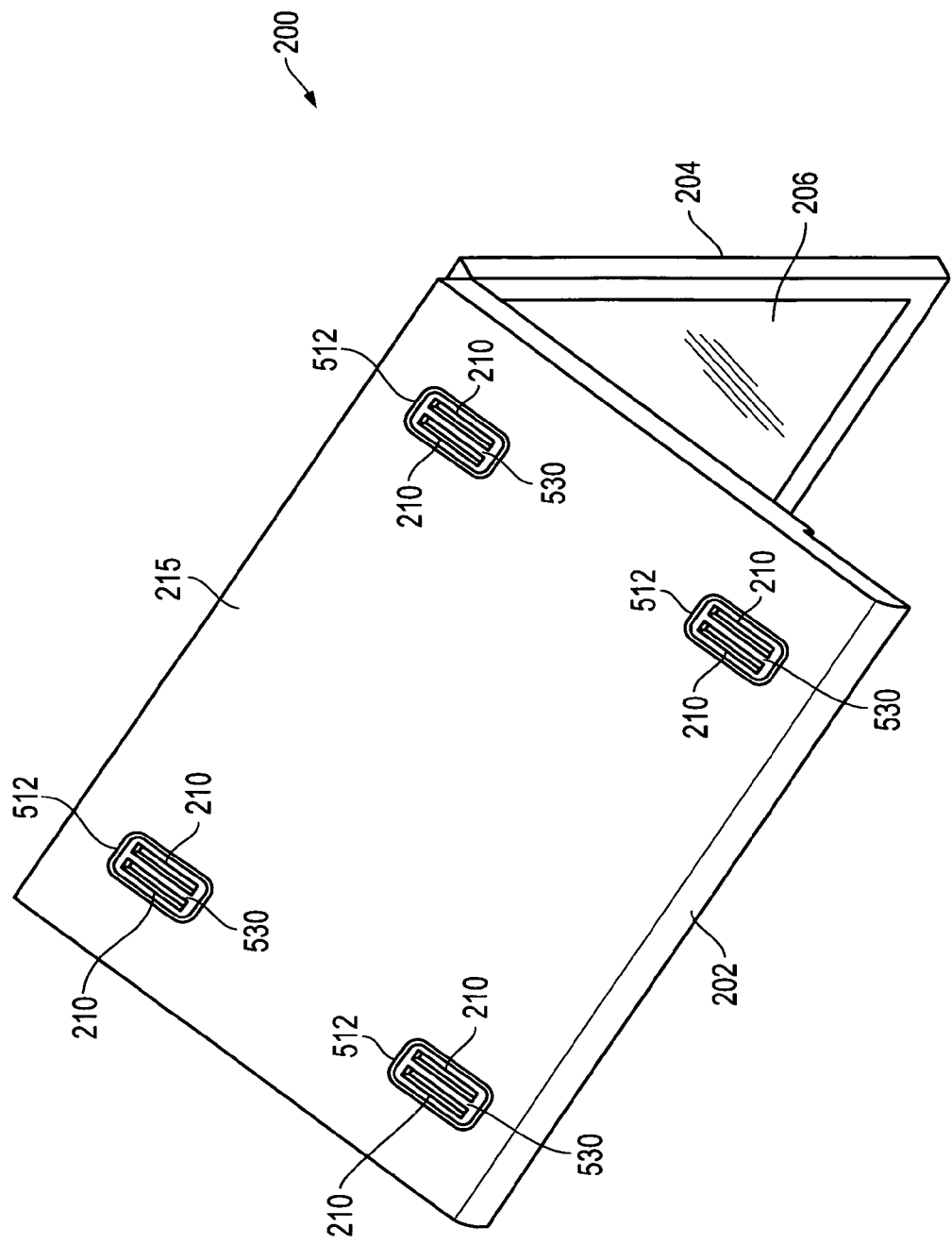
FIG. 8 illustrates a perspective view of a portable information handling system configured according to one exemplary embodiment of the apparatus and methods disclosed herein.

FIG. 8 illustrates a perspective view of the exterior surface 215 of chassis base 202 of notebook computer 200, without the presence of resilient support foot structures 100. Visible in FIG. 8 are four support foot locations that are each formed by a pair of parallel slots 210 defined in the chassis base 202. Each pair of parallel slots 210 of a given support foot location is configured to receive the flexible flap members 104a and 104b of a corresponding resilient support foot structure 100. An optional foot retaining feature 512 may be provided to at least partially surround each pair of parallel slots 210 of a support foot location and is configured to receive and contain the outer boundary of the central foot member 102 of each resilient support foot structure 100 in a manner as previously described.

Figure 9:
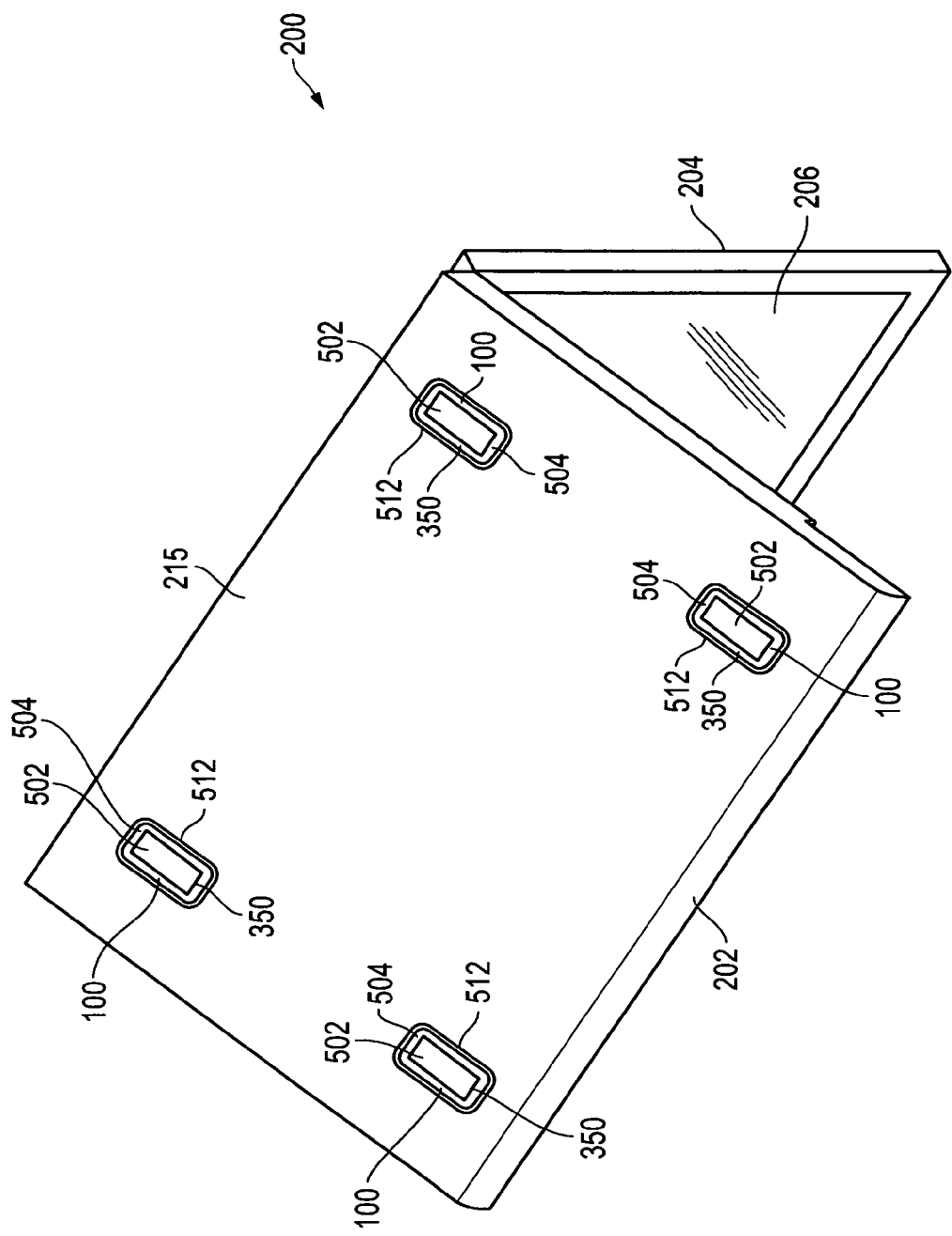
FIG. 9 illustrates a perspective view of a portable information handling system configured according to one exemplary embodiment of the apparatus and methods disclosed herein.

FIG. 9 illustrates a perspective view of exterior surface 215 of chassis base 202 of notebook computer 200, showing a resilient support foot structure 100 assembled to the chassis base 202 at each of four support foot locations shown in FIG. 8. Visible in FIG. 9 are four resilient support foot structures 100 which are each received and at least partially contained within the foot retaining feature 512 of a corresponding support foot location. On the underside of each support foot structure 100 is an optional recess 502 surrounded by a raised flexible boundary wall 504 as previously described.

Figure 10:
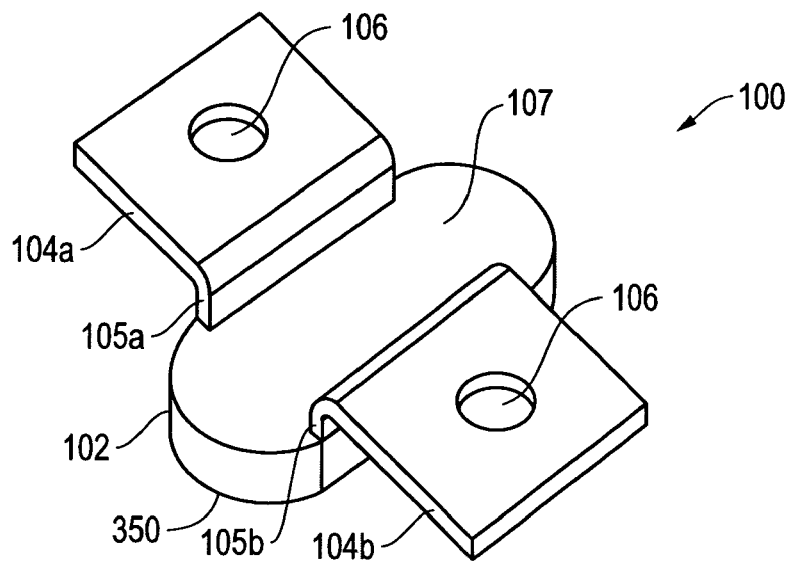
FIG. 10 illustrates a perspective view of a support foot apparatus configured according to one exemplary embodiment of the apparatus and methods disclosed herein.
Figure 11:
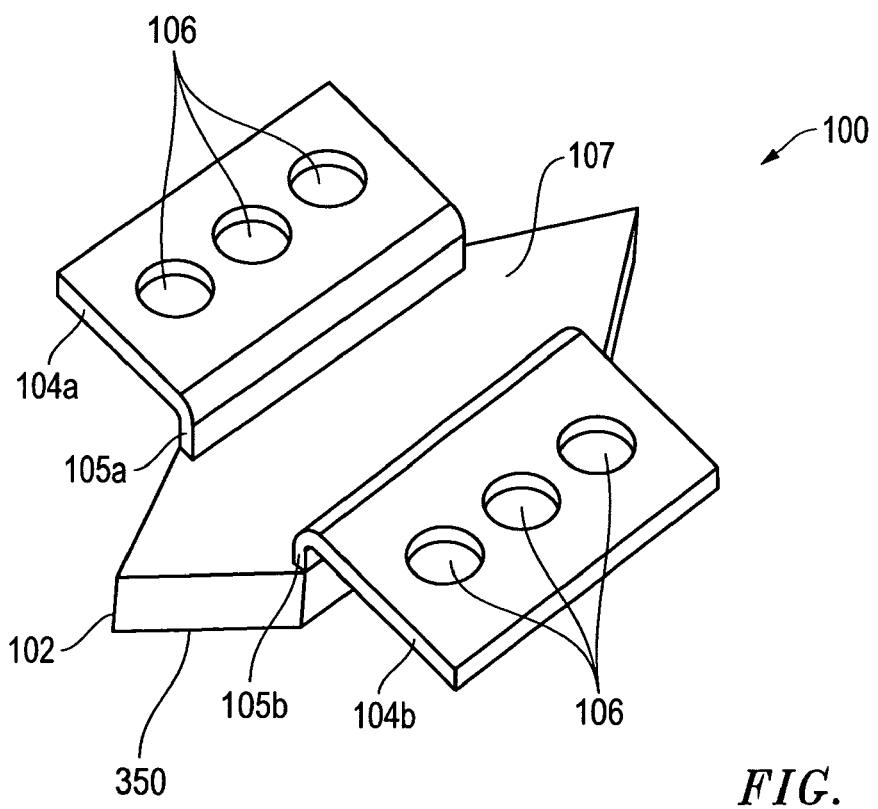
FIG. 11 illustrates a perspective view of a support foot apparatus configured according to one exemplary embodiment of the apparatus and methods disclosed herein.

It will be understood that the particular configuration of resilient support foot structures 100 and chassis support foot location features that are illustrated herein are exemplary only. In this regard, a resilient support foot structure may be alternatively configured with a foot member and/or flexible flap members of different dimensions and shapes, and may be configured with varying number of securing apertures that are configured to receive a corresponding varying number of securing posts at a given chassis location. For example, FIG. 10 illustrates a resilient support foot structure 100 of an alternative embodiment that has only one securing aperture 106 defined in each flexible flap member 104 for receiving a corresponding securing post at a chassis support foot location. Further, the central support body 102 of FIG. 10 is configured with a rounded shape as shown. FIG. 11 illustrates a resilient support foot structure 100 of another alternative embodiment that has three securing apertures 106 defined in each flexible flap member 104 for receiving corresponding securing posts at a chassis support foot location. Further, the central support body 102 of FIG. 10 is configured with a diamond shape as shown.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed apparatus and methods may be utilized in various combinations and/or independently. Thus the invention is not limited to only those combinations shown herein, but rather may include other combinations.

What is claimed is:

1. A chassis assembly, comprising
   a chassis; and
   at least one support foot location defined in the chassis that includes:
      at least first and second flap openings defined within the chassis with a dividing member therebetween, and
      at least one first securing post and at least one second securing post disposed within the chassis such that the first flap opening is defined between the dividing member and the first securing post and the second flap opening is defined between the dividing member and the second securing post; and
   at least one support foot structure coupled to the chassis at the support foot location, the support foot structure comprising a central foot member coupled between opposing first and second flexible flap members, each of the first and second flexible flap members having at least one securing aperture defined therein;
   where the first flexible flap member extends into the chassis through the first flap opening such that the securing aperture of the first flexible flap member is received around the first securing post and where the second flexible flap member extends into the chassis through the second flap opening such that the securing aperture of the second flexible flap member is received around the second securing post to substantially secure the central foot member in a position outside the chassis and adjacent the dividing member of the foot location.

2. The chassis assembly of claim 1, where the at least one support foot structure is composed of a single piece of resilient material.

3. The chassis assembly of claim 1, where the central foot member includes a chassis side surface and an opposing support side surface; where the first and second flexible flap members each include a flexible offset section that couples the respective flexible flap member to the central foot member; and where the flexible offset section of each respective first and second flexible flap member extends through the respective first or second flap opening of the support foot location.

4. The chassis assembly of claim 1, where the central foot member of the support foot structure includes a chassis side surface and an opposing support side surface; and where the chassis side surface is secured against the dividing member of the support foot location by an adhesive.

5. The chassis assembly of claim 1, where a terminal end of the first securing post is deformed to a shape that prevents removal of the securing aperture of the first flexible flap member from engagement around the first securing post; and where a terminal end of the second securing post is deformed to a shape that prevents removal of the securing aperture of the second flexible flap member from engagement around the second securing post.

6. The chassis assembly of claim 1, where the support foot location of the chassis includes two first securing posts and two second securing posts disposed within the chassis such that the first flap opening is defined between the dividing member and the two first securing posts and the second flap opening is defined between the dividing member and the two second securing posts; where each of the first and second flap members have two securing apertures defined therein; and where the first flexible flap member extends into the chassis through the first flap opening such that each of the two securing apertures of the first flexible flap member is received around a respective one of the first securing posts and where the second flexible flap member extends into the chassis through the second flap opening such that each of the two securing apertures of the second flexible flap member is received around a respective one of the second securing posts to substantially secure the central foot member in a position outside the chassis and adjacent the dividing member of the foot location.

7. The chassis assembly of claim 1, further comprising a foot retaining feature projecting outward from the exterior surface of the chassis at the support foot location, the foot retaining feature being dimensioned to receive and at least partially contain an outer boundary of the central foot member of the support foot structure.

8. The chassis assembly of claim 1, where:
   the chassis has multiple support foot locations that each include:
      at least first and second flap openings defined within the chassis with a dividing member therebetween, and
      at least one first securing post and at least one second securing post disposed within the chassis such that the first flap opening is defined between the dividing member and the first securing post and the second flap opening is defined between the dividing member and the second securing post;
   the chassis assembly further comprises multiple support foot structures that are each coupled to the chassis at a respective one of the support foot locations, each of the multiple support foot structures comprising a central foot member coupled between opposing first and second flexible flap members, each of the first and second flexible flap members having at least one securing aperture defined therein; and
   the first flexible flap member of each support foot structure extends into the chassis through the first flap opening of a respective one of the support foot locations such that the securing aperture of the first flexible flap member is received around the first securing post of the respective one of the support foot locations, and where the second flexible flap member extends into the chassis through the second flap opening of the respective one of the support foot locations such that the securing aperture of the second flexible flap member is received around the second securing post of the respective one of the support foot locations to substantially secure the central foot member in a position outside the chassis and adjacent the dividing member of the foot location.

9. The chassis assembly of claim 1, where the chassis is a chassis of an information handling system that includes one or more system components disposed within the chassis above the support foot location.

10. A support foot structure configured to be coupled to a chassis at a support foot location having at least first and second flap openings defined within the chassis with a dividing member therebetween, the support foot structure comprising:
   a central foot member coupled between opposing first and second flexible flap members, each of the first and second flexible flap members having at least one securing aperture defined therein;
   where the first and second flexible flap members are configured such that the first flap member is extendable into the chassis through the first flap opening with the securing aperture of the first flexible flap member received around a first securing post of the support foot location at the same time that the second flexible flap member is extendable into the chassis through the second flap opening with the securing aperture of the second flexible flap member received around a second securing post of the support foot location to substantially secure the central foot member in a position outside the chassis and adjacent the dividing member of the foot location.

11. The support foot structure of claim 10, where the at least one support foot structure is composed of a single piece of resilient material.

12. The support foot structure of claim 10, where the central foot member includes a chassis side surface and an opposing support side surface; where the first and second flexible flap members each include a flexible offset section that couples the respective flexible flap member to the central foot member; and where the flexible offset section of each respective first and second flexible flap member is configured to extend through the respective first or second flap opening of the support foot location.

13. The support foot structure of claim 10, where the central foot includes a chassis side surface and an opposing support side surface, a recess being defined in the support side surface by a flexible boundary wall.

14. The support foot structure of claim 10, where each of the first and second flap members have two securing apertures defined therein; where the first and second flexible flap members are configured such that the first flap member is extendable into the chassis through the first flap opening with each of the two securing apertures of the first flexible flap member being received around a respective one of two first securing posts of the support foot location at the same time that the second flexible flap member is extendable into the chassis through the second flap opening with each of the two securing apertures of the second flexible flap member being received around a respective one of two second securing posts of the support foot location to substantially secure the central foot member in a position outside the chassis and adjacent the dividing member of the foot location.

15. A method for coupling a support foot structure to a chassis, comprising:
   providing a support foot structure comprising a central foot member coupled between opposing first and second flexible flap members, each of the first and second flexible flap members having at least one securing aperture defined therein;
   providing a chassis having at least one support foot location that includes:
      at least first and second flap openings defined within the chassis with a dividing member therebetween, and
      at least one first securing post and at least one second securing post disposed within the chassis such that the first flap opening is defined between the dividing member and the first securing post and the second flap opening is defined between the dividing member and the second securing post;
   inserting the first flexible flap member into the chassis through the first flap opening and placing the securing aperture of the first flexible flap member around the first securing post; and
   inserting the second flexible flap member into the chassis through the second flap opening and placing the securing aperture of the second flexible flap member around the second securing post to substantially secure the central foot member in a position outside the chassis and adjacent the dividing member of the foot location.

16. The method of claim 15, further comprising providing the at least one support foot structure as a single piece of resilient material by single step injection molding.

17. The method of claim 15, where the central foot member of the support foot structure includes a chassis side surface and an opposing support side surface; and where the method further comprises securing the support side structure of the central foot member to the dividing member using adhesive.

18. The method of claim 15, further comprising deforming a terminal end of the first securing post to a shape that prevents removal of the securing aperture of the first flexible flap member from engagement around the first securing post; and deforming a terminal end of the second securing post to a shape that prevents removal of the securing aperture of the second flexible flap member from engagement around the second securing post.

19. The method of claim 15, where the support foot location of the chassis includes two first securing posts and two second securing posts disposed within the chassis such that the first flap opening is defined between the dividing member and the two first securing posts and the second flap opening is defined between the dividing member and the two second securing posts; where each of the first and second flap members have two securing apertures defined therein; and where the method further comprises inserting the first flexible flap member into the chassis through the first flap opening and placing each of the two securing apertures of the first flexible flap member around a respective one of the first securing posts, inserting the second flexible flap member into the chassis through the second flap opening and placing each of the two securing apertures of the second flexible flap member around a respective one of the second securing posts to substantially secure the central foot member in a position outside the chassis and adjacent the dividing member of the foot location.

20. The method of claim 15, where the chassis is an information handling system chassis; and where the method further comprises providing one or more system components within the chassis over the support foot location after performing the steps of inserting and placing.

* * * * *